US012596545B2

(12) United States Patent
Ilincic et al.

(10) Patent No.: US 12,596,545 B2
(45) Date of Patent: *Apr. 7, 2026

(54) TECHNIQUES TO PERFORM APPLET PROGRAMMING

(71) Applicant: Capital One Services, LLC, McLean, VA (US)

(72) Inventors: Rajko Ilincic, Annandale, VA (US); Jeffrey Rule, Chevy Chase, MD (US)

(73) Assignee: Capital One Services, LLC., McLean, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/677,114

(22) Filed: May 29, 2024

(65) Prior Publication Data

US 2024/0311137 A1    Sep. 19, 2024

Related U.S. Application Data

(63) Continuation of application No. 17/080,264, filed on Oct. 26, 2020, which is a continuation of application
(Continued)

(51) Int. Cl.
    *G06K 19/06*        (2006.01)
    *G06F 8/65*         (2018.01)
    (Continued)

(52) U.S. Cl.
    CPC ................. *G06F 8/65* (2013.01); *G06F 8/71* (2013.01); *G06K 19/07* (2013.01); *H04L 9/3247* (2013.01); *H04L 63/0428* (2013.01)

(58) Field of Classification Search
    CPC .. G06F 8/71; G06F 8/65; G06K 19/07; H04L 9/3247; H04L 63/0428
    (Continued)

(56) References Cited

U.S. PATENT DOCUMENTS 4,683,553 A * 7/1987 Mollier ................ G06Q 20/346
                                                    235/382
5,590,038 A   12/1996 Pitroda
              (Continued)

FOREIGN PATENT DOCUMENTS

CN        101192295 A     6/2008
EP          0949595 A2   10/1999
              (Continued)

OTHER PUBLICATIONS

Author Unknown, "Global expansion of card tapping mobile OTP for security and convenience is imminent," Jun. 28, 2022, website: https://www.swidch.com/blogs/card-tapping-motp-blog.
(Continued)

*Primary Examiner* — Daniel St Cyr
(74) *Attorney, Agent, or Firm* — KDW FIRM PLLC

(57)            ABSTRACT

Various embodiments are generally directed to techniques provide applets to transaction card. In embodiments, a transaction card may receive an applet signed with a verification signature. The transaction card may determine whether the verification signature matches one of the verification values stored on the memory, enable the applet including the instructions for execution by the processing circuitry in response to the determination the verification signature matches one of the verification values, and prevent enablement of the applet including the instructions for execution in response to the determination the verification signature does not match any of the verification values.

30 Claims, 9 Drawing Sheets

Related U.S. Application Data

No. 16/503,003, filed on Jul. 3, 2019, now Pat. No. 10,871,958.

(51) Int. Cl.

| | |
|---|---|
| *G06F 8/71* | (2018.01) |
| *G06K 19/07* | (2006.01) |
| *H04L 9/32* | (2006.01) |
| *H04L 9/40* | (2022.01) |

(58) Field of Classification Search

USPC .......................................... 235/492, 380, 383

See application file for complete search history.

(56) References Cited

U.S. PATENT DOCUMENTS

| | | | |
|---|---|---|---|
| 5,666,415 A | | 9/1997 | Kaufman |
| 5,778,072 A * | | 7/1998 | Samar ................... G07F 7/1008 |
| | | | 713/172 |
| 6,199,114 B1 | | 3/2001 | White |
| 6,324,271 B1 | | 11/2001 | Sawyer |
| 6,367,011 B1 | | 4/2002 | Lee |
| 6,572,015 B1 | | 6/2003 | Norton |
| 7,127,601 B2 * | | 10/2006 | Cheon ................... G06F 9/4411 |
| | | | 713/1 |
| 7,252,242 B2 | | 8/2007 | Ho |
| 7,270,276 B2 | | 9/2007 | Vayssiere |
| 7,287,692 B1 | | 10/2007 | Patel |
| 7,374,099 B2 | | 5/2008 | de Jong |
| 7,527,208 B2 | | 5/2009 | Hammad |
| 7,568,631 B2 | | 8/2009 | Gibbs |
| 7,584,153 B2 | | 9/2009 | Brown |
| 7,628,322 B2 | | 12/2009 | Holtmanns |
| 7,748,609 B2 * | | 7/2010 | Sachdeva ................ G06F 21/33 |
| | | | 235/376 |
| 7,793,851 B2 | | 9/2010 | Mullen |
| 7,797,248 B1 * | | 9/2010 | Bierbaum .............. G06Q 20/40 |
| | | | 705/41 |
| 7,801,799 B1 | | 9/2010 | Brake, Jr. |
| 7,908,216 B1 | | 3/2011 | Davis |
| 7,922,082 B2 | | 4/2011 | Muscato |
| 8,010,405 B1 | | 8/2011 | Bortolin |
| 8,074,877 B2 | | 12/2011 | Mullen |
| 8,082,450 B2 | | 12/2011 | Frey |
| 8,108,687 B2 | | 1/2012 | Ellis |
| 8,186,602 B2 | | 5/2012 | Itay |
| 8,196,131 B1 | | 6/2012 | von Behren |
| 8,249,654 B1 | | 8/2012 | Zhu |
| 8,276,814 B1 | | 10/2012 | Davis |
| 8,332,272 B2 | | 12/2012 | Fisher |
| 8,346,670 B2 | | 1/2013 | Hasson |
| 8,511,547 B2 | | 8/2013 | Rans |
| 8,519,822 B2 | | 8/2013 | Riegebauer |
| 8,750,514 B2 | | 6/2014 | Gallo |
| 8,870,081 B2 | | 10/2014 | Olson |
| 9,038,893 B2 | | 5/2015 | Kirkham |
| 9,129,199 B2 | | 9/2015 | Spodak |
| 9,183,490 B2 | | 11/2015 | Moreton |
| 9,275,325 B2 | | 3/2016 | Newcombe |
| 9,286,606 B2 | | 3/2016 | Diamond |
| 9,306,753 B1 | | 4/2016 | Vandervort |
| 9,501,776 B2 | | 11/2016 | Martin |
| 9,710,744 B2 | | 7/2017 | Wurmfeld |
| 9,949,065 B1 | | 4/2018 | Zarakas |
| 9,965,632 B2 | | 5/2018 | Zarakas |
| 9,965,911 B2 | | 5/2018 | Wishne |
| 9,977,890 B2 | | 5/2018 | Alberti |
| 9,978,056 B2 | | 5/2018 | Seo |
| 9,978,058 B2 | | 5/2018 | Wurmfeld |
| 9,990,795 B2 | | 6/2018 | Wurmfeld |
| 10,007,873 B2 | | 6/2018 | Heo |
| 10,013,693 B2 | | 7/2018 | Wyatt |
| 10,121,130 B2 | | 11/2018 | Pinski |
| 10,210,505 B2 | | 2/2019 | Zarakas |
| 10,242,368 B1 | | 3/2019 | Poole |
| 10,296,910 B1 | | 5/2019 | Templeton |
| 10,332,102 B2 | | 6/2019 | Zarakas |
| 10,360,557 B2 | | 7/2019 | Locke |
| 10,380,471 B2 | | 8/2019 | Locke |
| 10,395,244 B1 | | 8/2019 | Mossler |
| 10,453,054 B2 | | 10/2019 | Zarakas |
| 10,474,941 B2 | | 11/2019 | Wurmfeld |
| 10,475,027 B2 | | 11/2019 | Guise |
| 10,482,453 B2 | | 11/2019 | Zarakas |
| 10,482,457 B2 | | 11/2019 | Poole |
| 10,489,774 B2 | | 11/2019 | Zarakas |
| 10,489,781 B1 | | 11/2019 | Osborn |
| 10,510,070 B2 | | 12/2019 | Wurmfeld |
| 10,515,361 B2 | | 12/2019 | Zarakas |
| 10,535,068 B2 | | 1/2020 | Locke |
| 10,546,444 B2 | | 1/2020 | Osborn |
| 10,581,611 B1 | | 3/2020 | Osborn |
| 10,664,830 B1 | | 5/2020 | Rule |
| 10,685,349 B2 | | 6/2020 | Brickell |
| 10,797,882 B2 | | 10/2020 | Rule |
| 10,880,741 B2 | | 12/2020 | Zarakas |
| 10,909,525 B1 | | 2/2021 | Dhodapkar |
| 10,970,691 B2 | | 4/2021 | Koeppel |
| 10,984,416 B2 | | 4/2021 | Ilincic |
| 11,037,136 B2 | | 6/2021 | Rule |
| 11,062,098 B1 | | 7/2021 | Bergeron |
| 11,120,453 B2 | | 9/2021 | Rule |
| 11,138,593 B1 | | 10/2021 | Ho |
| 11,138,605 B2 | | 10/2021 | Aabye |
| 11,176,540 B2 | | 11/2021 | Gupta |
| 11,188,908 B2 | | 11/2021 | Locke |
| 11,216,806 B2 | | 1/2022 | Mossler |
| 11,297,958 B2 | | 4/2022 | Vukich |
| 11,334,872 B2 | | 5/2022 | Phillips |
| 11,361,173 B2 | | 6/2022 | Edwards |
| 11,392,933 B2 | | 7/2022 | Mossler |
| 11,392,935 B2 | | 7/2022 | Suresh |
| 11,416,844 B1 | | 8/2022 | Osterkamp |
| 11,423,392 B1 | | 8/2022 | Ho |
| 11,443,292 B2 | | 9/2022 | Sherif |
| 11,444,770 B2 | | 9/2022 | Wieker |
| 11,461,764 B2 | | 10/2022 | Rule |
| 11,481,764 B2 | | 10/2022 | Shakkarwar |
| 11,521,213 B2 | | 12/2022 | Rule |
| 11,551,200 B1 | | 1/2023 | Cook |
| 11,556,918 B2 | | 1/2023 | Mestre |
| 11,615,395 B2 | | 3/2023 | McHUGH |
| 11,777,933 B2 | | 10/2023 | Moreton |
| 2003/0220876 A1 | | 11/2003 | Burger |
| 2005/0156026 A1 | | 7/2005 | Ghosh |
| 2005/0228997 A1 | | 10/2005 | Bicker |
| 2005/0269402 A1 | | 12/2005 | Spitzer |
| 2007/0276765 A1 | | 11/2007 | Hazel |
| 2008/0082452 A1 | | 4/2008 | Wankmueller |
| 2008/0099552 A1 | | 5/2008 | Grillion |
| 2009/0143104 A1 | | 6/2009 | Loh |
| 2009/0235339 A1 | | 9/2009 | Mennes |
| 2009/0282264 A1 | | 11/2009 | Amiel |
| 2011/0113245 A1 | | 5/2011 | Varadarajan |
| 2011/0155801 A1 | | 6/2011 | Rowberry |
| 2012/0143703 A1 | | 6/2012 | Wall |
| 2013/0030997 A1 | | 1/2013 | Spodak |
| 2013/0146657 A1 | | 6/2013 | Graef |
| 2013/0211937 A1 | | 8/2013 | Elbirt |
| 2013/0311363 A1 | | 11/2013 | Ramaci |
| 2014/0074637 A1 | | 3/2014 | Hammad |
| 2014/0074655 A1 | | 3/2014 | Lim |
| 2014/0081785 A1 | | 3/2014 | Valadas Preto |
| 2014/0365377 A1 | | 12/2014 | Salama |
| 2015/0032635 A1 | | 1/2015 | Guise |
| 2015/0073983 A1 | | 3/2015 | Bartenstein |
| 2015/0113271 A1 | | 4/2015 | Jooste |
| 2015/0134513 A1 | | 5/2015 | Olson |
| 2015/0199673 A1 | | 7/2015 | Savolainen |
| 2015/0199863 A1 | | 7/2015 | Scoggins |
| 2015/0254637 A1 | | 9/2015 | Yang |
| 2015/0317295 A1 | | 11/2015 | Sherry |
| 2016/0078430 A1 | | 3/2016 | Douglas |
| 2016/0189143 A1 | | 6/2016 | Koeppel |

(56) References Cited

U.S. PATENT DOCUMENTS

| | | | |
|---|---|---|---|
| 2016/0253651 A1 | 9/2016 | Park | |
| 2016/0277383 A1 | 9/2016 | Guyomarc'H | |
| 2016/0307189 A1 | 10/2016 | Zarakas | |
| 2016/0314472 A1 | 10/2016 | Ashfield | |
| 2016/0379217 A1 | 12/2016 | Hammad | |
| 2017/0017957 A1 | 1/2017 | Radu | |
| 2017/0039566 A1 | 2/2017 | Schipperheijn | |
| 2017/0068950 A1 | 3/2017 | Kwon | |
| 2017/0109532 A1* | 4/2017 | Zarakas | G06F 8/654 |
| 2017/0330173 A1 | 11/2017 | Woo | |
| 2018/0039987 A1 | 2/2018 | Molino | |
| 2018/0268132 A1 | 9/2018 | Buer | |
| 2018/0300716 A1 | 10/2018 | Carlson | |
| 2019/0172055 A1 | 6/2019 | Hale | |
| 2019/0303945 A1 | 10/2019 | Mitra | |
| 2021/0004806 A1 | 1/2021 | Noe | |
| 2021/0272098 A1 | 9/2021 | Delsuc | |
| 2021/0304189 A1 | 9/2021 | Gupta | |
| 2021/0383360 A1 | 12/2021 | Sinha | |
| 2021/0406869 A1 | 12/2021 | Pathrabe | |
| 2022/0114581 A1 | 4/2022 | Upadhye | |
| 2022/0284416 A1 | 9/2022 | Rule | |
| 2022/0309509 A1 | 9/2022 | Akgun | |
| 2022/0335412 A1 | 10/2022 | Rule | |
| 2022/0366410 A1 | 11/2022 | Rule | |
| 2022/0398566 A1 | 12/2022 | Rule | |
| 2022/0414648 A1 | 12/2022 | Rule | |
| 2023/0054157 A1 | 2/2023 | Mao | |
| 2023/0065163 A1 | 3/2023 | Vargas | |
| 2023/0083785 A1 | 3/2023 | Maiman | |
| 2023/0169505 A1 | 6/2023 | Rule | |
| 2023/0354020 A1 | 11/2023 | Rule | |
| 2023/0359839 A1 | 11/2023 | Lovgren | |

FOREIGN PATENT DOCUMENTS

| | | | | |
|---|---|---|---|---|
| EP | 1004992 | * | 5/2000 | G06K 19/073 |
| EP | 1004992 | A2 | 5/2000 | |
| GB | 2516861 | A | 2/2015 | |
| GB | 2551907 | A | 1/2018 | |
| JP | H1165827 | A | 3/1999 | |
| JP | H11345266 | A | 12/1999 | |
| JP | 2001312402 | A | 11/2001 | |
| JP | 2004086771 | A | 3/2004 | |
| JP | 2007257543 | A | 10/2007 | |
| JP | 2009070158 | A | 4/2009 | |
| JP | 2013539895 | A | 10/2013 | |
| KR | 20040051966 | A | 6/2004 | |
| KR | 20040079166 | A | 9/2004 | |
| KR | 20120129617 | A | 11/2012 | |
| KR | 101283989 | B1 | 7/2013 | |
| KR | 20150110875 | A | 10/2015 | |
| KR | 20150140132 | A | 12/2015 | |
| WO | 9910824 | A1 | 3/1999 | |
| WO | 0049586 | A1 | 8/2000 | |
| WO | 2013155562 | A1 | 10/2013 | |
| WO | 2015183818 | A1 | 12/2015 | |
| WO | 2017047855 | A1 | 3/2017 | |
| WO | 2019022585 | A1 | 1/2019 | |
| WO | 2021051884 | A1 | 3/2021 | |
| WO | 2021133492 | A1 | 7/2021 | |
| WO | 2022108959 | A1 | 5/2022 | |
| WO | 2022187350 | A1 | 9/2022 | |
| WO | 2023017943 | A1 | 2/2023 | |
| WO | 2023064063 | A1 | 4/2023 | |

OTHER PUBLICATIONS

Author Unknown, "Autofill credit cards, contacts, and passwords in Safari on Mac", Apple Safari User Guide [online] 2019 [retrieved on Mar. 25, 2019]. Retrieved from Internet URL: https://support. apple.com/guide/safari/use-autofill-ibrw1103/mac, 3 pages.

Author Unknown, "Autofill", Computer Hope [online] 2018 [retrieved on Mar. 25, 2019]. Retrieved from Internet URL: https://www. computerhope.com/jargon/a/autofill.htm, 2 pages.

Batina et al., "SmartCards and RFID", PowerPoint Presentation for IPA Security Course, Digital Security at University of Nijmegen, Netherlands. Retrieved from Internet URL: https://www.cs.ru.nl/E. Poll/teaching/ipa_smartcards.pdf, available on at least Jun. 2, 2019 per Internet Archives, https://web.archive. org/, 75 pages.

EMVCo, LLC, "Emv Integrated Circuit Card Specifcations for Payment Systems, Book 2, Security and Key Management," Version 3.4, [online] 2011 [retrieved on Mar. 25, 2019]. Retrieved from Internet URL: https://www.emvco.com/wp-content/uploads/2017/05/EMV_v4.3_Book_2_Security_and_Key_Management_20120607061923900.pdf, 174 pages.

EMVCo, LLC, "EMV Card Personalisation Specification," Aug. 1, 2021, retrieved from the Internet URL: https://www.emvco.com/specification/?post_id=12467, 114 pages.

EMVCo, LLC, "EMV Card Personalization Specification," Specification version 1.0, (2003) 81 pages.

EMVCo, LLC, "EMV Contactless Specifications for Payment Systems", EMV Book B—Entry Point Specification [online] 2016 [retrieved on Mar. 25, 2019]. Retrieved from Internet URL: https://www.emvco.com/wp-content/uploads/2017/05/BookB_Entry_Point_Specification_v2_6_2016080902325 . . . , 52 pages.

Faraj, S.T., et al., "Investigation of Java Smart Card Technology for Multi-Task Applications", J of Al-Anbar University for Pure Science, 2(1):23 pages (2008).

Katz, J. and Lindell, Y., "Aggregate Message Authentication Codes", Topics in Cryptology [online] 2008 [retrieved on Mar. 25, 2019]. Retrieved from Internet URL: https://www.cs.umd.edu/~jkatz/papers/aggregateMAC.pdf, 11 pages.

Pourghomi, P., et al., "A Proposed NFC Payment Application," International Journal of Advanced Computer Science and Applications, 4(8): 173-181 (2013).

Saush, "Getting information from an EMV chip card with Java," Sep. 8, 2006, WordPress, pp. 1-13.

Saxena, N., "Lecture 10: NMAC, HMAC and No. Theory", CS 6903 Modern Cryptography [online] 2008 [retrieved on Mar. 25, 2019]. Retrieved from Internet URL: http://isis.poly.edu/courses/cs6903/Lectures/lecture10.pdf, 8 pages.

Smart Card Alliance, "Co-Branded Multi-Application Contactless Cards for Transit and Financial Payment," A Smart Card Alliance Transportation Council White Paper (40 pages), Mar. 2008.

Ullmann et al., "On-Card" User Authentication for Contactless Smart Cards based on Gesture Recognition, paper presentation LNI proceedings, (2012) 12 pages.

Van den Breekel, J., et al., "EMV in a nutshell", Technical Report, 2016 [retrieved on Mar. 25, 2019]. Retrieved from Internet URL: https://www.cs.ru.nl/E.Poll/papers/EMVtechreport.pdf, 37 pages.

* cited by examiner

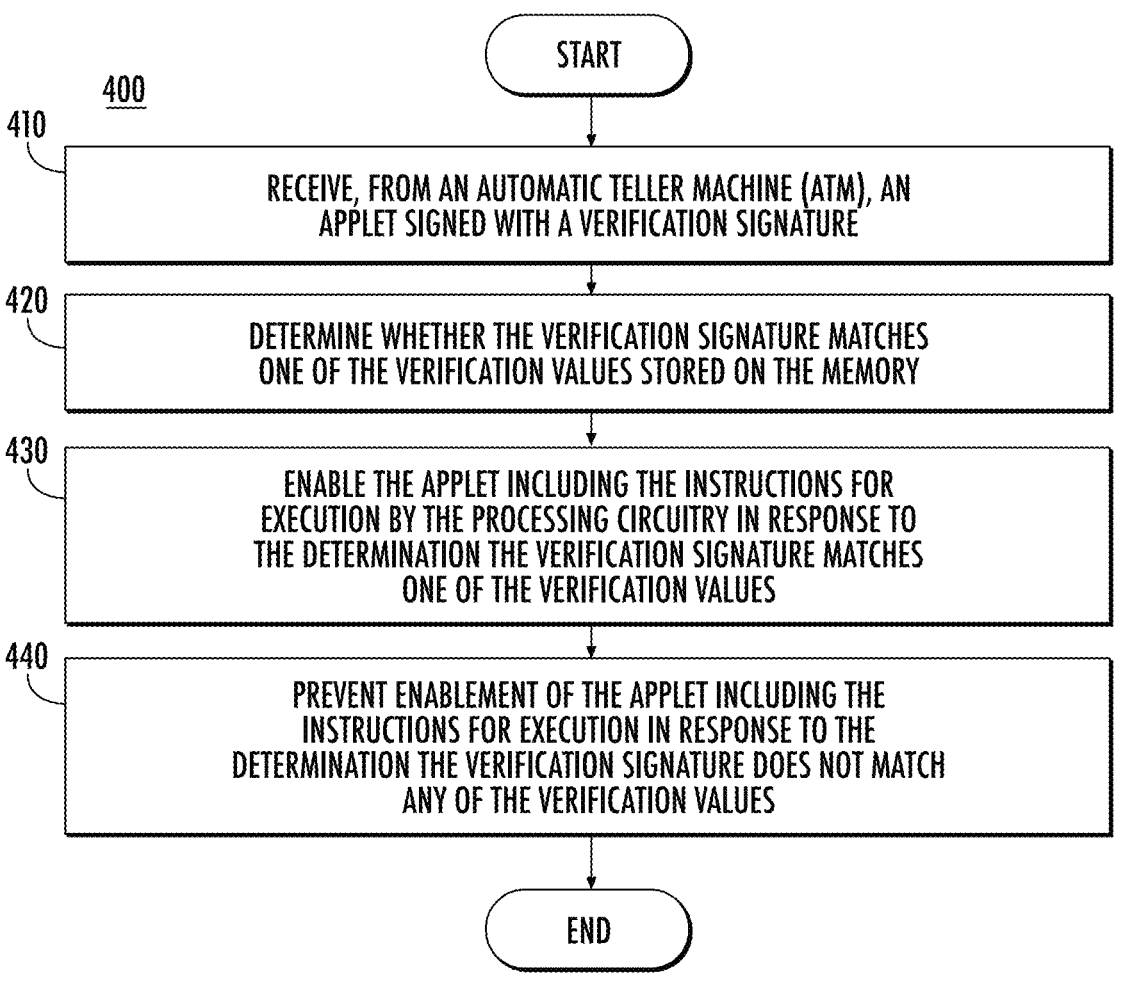

400

410

420

430

440

START

RECEIVE, FROM AN AUTOMATIC TELLER MACHINE (ATM), AN
APPLET SIGNED WITH A VERIFICATION SIGNATURE

DETERMINE WHETHER THE VERIFICATION SIGNATURE MATCHES
ONE OF THE VERIFICATION VALUES STORED ON THE MEMORY

ENABLE THE APPLET INCLUDING THE INSTRUCTIONS FOR
EXECUTION BY THE PROCESSING CIRCUITRY IN RESPONSE TO
THE DETERMINATION THE VERIFICATION SIGNATURE MATCHES
ONE OF THE VERIFICATION VALUES

PREVENT ENABLEMENT OF THE APPLET INCLUDING THE
INSTRUCTIONS FOR EXECUTION IN RESPONSE TO THE
DETERMINATION THE VERIFICATION SIGNATURE DOES NOT MATCH
ANY OF THE VERIFICATION VALUES

END

FIG. 4

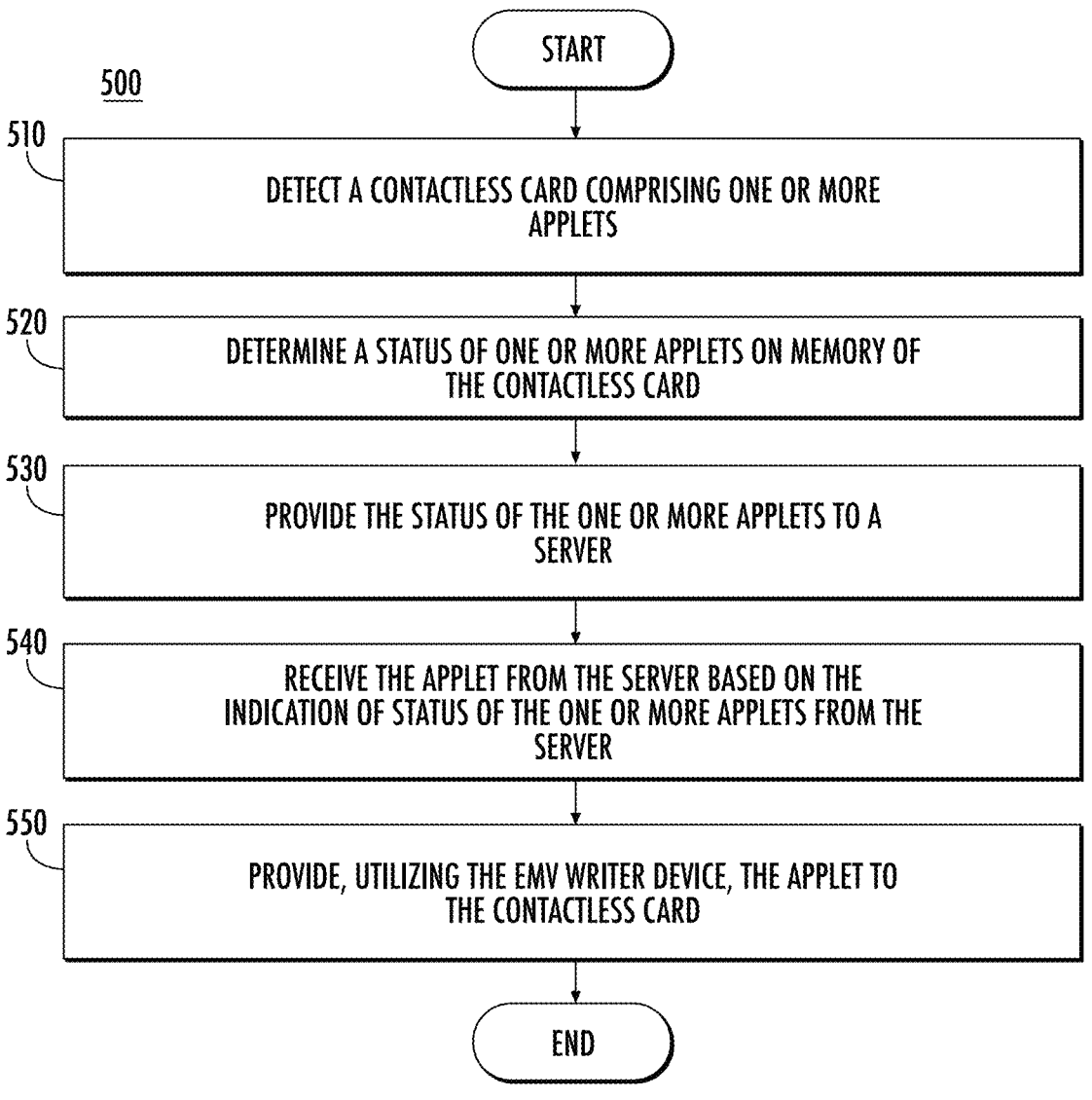

500

START

510 — DETECT A CONTACTLESS CARD COMPRISING ONE OR MORE APPLETS

520 — DETERMINE A STATUS OF ONE OR MORE APPLETS ON MEMORY OF THE CONTACTLESS CARD

530 — PROVIDE THE STATUS OF THE ONE OR MORE APPLETS TO A SERVER

540 — RECEIVE THE APPLET FROM THE SERVER BASED ON THE INDICATION OF STATUS OF THE ONE OR MORE APPLETS FROM THE SERVER

550 — PROVIDE, UTILIZING THE EMV WRITER DEVICE, THE APPLET TO THE CONTACTLESS CARD

END

CLIENT(S)

706

COMMUNICATION
FRAMEWORK

704

SERVER(S)

708

CLIENT DATA STORE(S)

710

SERVER DATA STORE(S)

TECHNIQUES TO PERFORM APPLET PROGRAMMING

RELATED APPLICATION

This application is a continuation of U.S. patent application Ser. No. 17/080,264, filed on Oct. 26, 2020, which is a continuation of U.S. patent application Ser. No. 16/503,003, titled "TECHNIQUES TO PERFORM APPLET PROGRAMMING" filed on Jul. 3, 2019. The contents of the aforementioned applications are incorporated herein by reference in their entirety.

BACKGROUND

Today credit card users can use their cards at merchants across the country and around the world. Card issuers continue to work tirelessly to increase security and protect cardholders' personal information, while also providing enhancements and new features. One new technology, is the Europay, Mastercard, Visa (EMV) chip card technology that increasingly being adopted by card issuers and merchants in the United States and around the world. Chip cards feature both the chip and traditional magnetic stripe, so they're usable even when the merchant doesn't yet support chip technology. When the card issuer and merchant both support chip technology, the chip card can be inserted into the terminal to complete the transaction. However, one drawback of the current card technology is that they are not easily upgradable in a secure manner. Thus, when there is a problem with the card, Card issuers typically issue a new card and the old card is discarded. This approach is costly and leaves card users without a card while they are waiting for a new card.

SUMMARY

Various embodiments described herein may include a transaction card including a memory to store instructions and one or more verification values, and processing circuitry, coupled with the memory. The processing circuitry operable to execute the instructions, that when executed, cause the processing circuitry to receive, from an automatic teller machine (ATM), an applet signed with a verification signature, the applet comprising instructions capable for execution by the processing circuitry, determine whether the verification signature matches one of the verification values stored on the memory, enable the applet including the instructions for execution by the processing circuitry in response to the determination the verification signature matches one of the verification values, and prevent enablement of the applet including the instructions for execution in response to the determination the verification signature does not match any of the verification values.

Various embodiments described herein may also include a system, a device, a computing device, etc. including an EMV device, a memory coupled with the EMV device, the memory to store instructions, and processing circuitry coupled with the memory and the EMV device. The processing circuitry operable to execute the instructions, that when executed, cause the processing circuitry to detect a transaction card comprising one or more applets, determine a status of the one or more applets on memory of the transaction card, provide the status of the one or more applets to a server, receive the applet from the server based on the status of the one or more applets, and provide, utilizing the EMV device, the applet to the transaction card.

Various embodiments described herein may also include a system, a device, a computing device, etc. to perform the method of A computer-implemented method, comprising receiving, by processing circuitry of a transaction card and from an automatic teller machine (ATM), an applet signed with a verification signature, the applet comprising instructions capable for execution by the processing circuitry, and wherein the transaction card comprises contact pads coupled with corresponding contact pads of the ATM to enable receiving of the applet, determining, by the processing circuitry, whether the verification signature matches one of a plurality verification values stored in a memory, causing enablement of the applet including the instructions for execution by the processing circuitry and storage of the applet in memory in response to the determination the verification signature matches one of the verification values, and causing discarding of the applet in response to the determination the verification signature does not match any of the verification values.

BRIEF DESCRIPTION OF THE DRAWINGS

FIG. 4 illustrates an example of a first flow diagram.

FIG. 5 illustrates an example of a second flow diagram.

DETAILED DESCRIPTION

Figure 1:
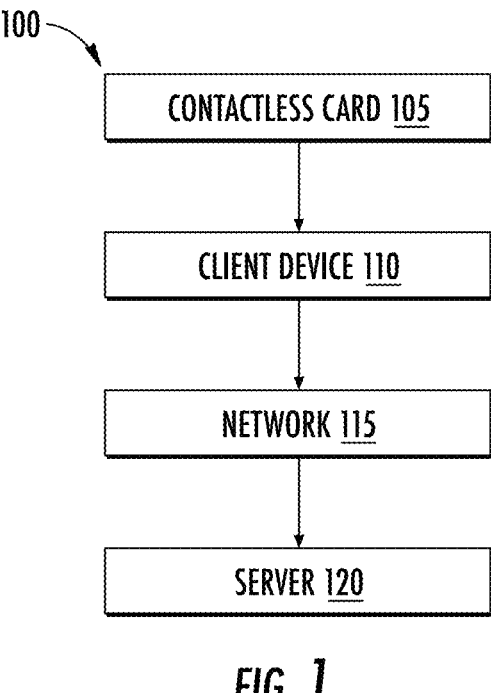
FIG. 1 is a diagram of a data transmission system according to an example embodiment.

Various embodiments are generally directed to providing improvements to transaction cards by enabling them to be upgraded and to install new features on them by users in a secure fashion. Today, transaction cards are typically pre-loaded with features by the issuing financial institutions and mailed to users. They are typically not upgradable or changeable in any way. Thus, as previously mentioned, when there is a problem with a transaction card, the card issuer issues a new transaction card and the user discards the old one, which is time consuming and expensive. Embodiments discussed herein enable users to upgrade and/or add new features or applets to transaction cards in a secure manner.

In one example, embodiments include a device, such as an Automatic Teller Machine (ATM) having a number of components to upgrade and/or install new applets on a transaction card. The ATM may be coupled with one or more backend systems, which may be operated by a secure institution, such as a financial institution or secure applet provider, and the backend systems may provide applets for installation and/or upgrade to the ATM. An applet, may be binary file or code that may be executable by circuitry of the transaction card once it is installed and verified on the transaction card.

For example, in embodiments an ATM may include components such as an EMV device, and a memory coupled with the EMV device. The ATM may further include processing circuitry coupled with the memory and the EMV device, and the processing circuitry is operable to execute instructions stored on the memory. In embodiments, the processing circuitry, when executing the instructions, may detect a transaction card comprising one or more applets. For example, the ATM may determine that a user has entered the transaction card in a card slot of the ATM. After the ATM verifies the identity of the user, e.g., a personal identification number, The ATM may determine a status of one or more applets on the transaction card, e.g., stored in the memory of the transaction card. The status of an applet may indicate whether it is functioning properly, the version of the applet, the name of the applet, and so forth. In embodiments, the ATM may provide the status of the one or more applets to a server, e.g., a backend system server.

The server may process the information from the ATM and determine whether any applets are needed for installation on the transaction card, e.g., if an applet is out of date. The ATM may receive the applet from the server based on the status of the one or more applets and provide the applet to the transaction card. For example, the ATM may write the applet to the transaction card via an EMV device.

In some instances, a new applet may be installed on the transaction card. For example, a user may make a selection via a graphical user interface (GUI) of a new applet. The ATM may provide information based on the selection to a server of a backend system. In return, the ATM may receive the applet from the backend system for installation on the transaction card. These and other details will become more apparent in the follow description.

Reference is now made to the drawings, wherein like reference numerals are used to refer to like elements throughout. In the following description, for purpose of explanation, numerous specific details are set forth in order to provide a thorough understanding thereof. It may be evident, however, that the novel embodiments can be practiced without these specific details. In other instances, well-known structures and devices are shown in block diagram form to facilitate a description thereof. The intention is to cover all modification, equivalents, and alternatives within the scope of the claims.

FIG. 1 illustrates a system 100 according to an example embodiment. As further discussed below, system 100 may include transaction card 105, client device 110, network 115, and server 120. Although FIG. 1 illustrates single instances of the components; system 100 may include any number of components.

System 100 may include one or more transaction cards 105, which are further explained below with reference to FIGS. 2A-2B. In some embodiments, the transaction card 105 may communicate with devices, such as the client device 110 via various wired and wireless communication techniques, such as Near Field Communication (NFC) and Europay, Mastercard, and Visa (EMV). However, embodiments are not limited in this manner and may include communicating with devices via other techniques.

System 100 may include client device 110, which may be a network-enabled computer. In embodiments, the client device 110 may be an automatic teller machine (ATM), a transaction machine, a transaction terminal, a teller terminal, an EMV chip reader/writer, and/or any device having the capability to read and write to EMV chips. The client device 110 may also be a computer device, or communications device including, e.g., a server, a network appliance, a personal computer, a workstation, a phone, a handheld PC, a personal digital assistant, a thin client, a fat client, an Internet browser, or other device. Client device 110 also may be a mobile device; for example, a mobile device may include an iPhone, iPod, iPad from Apple® or any other mobile device running Apple's iOS® operating system, any device running Microsoft's Windows® Mobile operating system, any device running Google's Android® operating system, and/or any other smartphone, tablet, or like wearable mobile device.

The client device 110 can include components including a processor and a memory, and it is understood that the processing circuitry may contain additional components, including processors, memories, error and parity/CRC checkers, data encoders, anti-collision algorithms, controllers, command decoders, security primitives, and tamper-proofing hardware, as necessary to perform the functions described herein. The client device 110 may further include a display and input devices. The display may be any type of device for presenting visual information such as a computer monitor, a flat panel display, and a mobile device screen, including liquid crystal displays, light-emitting diode displays, plasma panels, and cathode ray tube displays. The input devices may include any device for entering information into the user's device that is available and supported by the user's device, such as a touch-screen, keyboard, mouse, cursor-control device, touch-screen, microphone, digital camera, video recorder or camcorder. These devices may be used to enter information and interact with the software and other devices described herein. For example, the client device 110 may include one or more components to enable users to perform one or more operations for applets on the transaction card 105, e.g., add, update, delete, etc.

In embodiments, the client device 110 may include one or more input/output (I/O) devices including those to communicate using wireless and wired technologies. For example, the client device 110 may include one or more transceivers to communicate in a cellular frequency band, e.g., a 700 Megahertz (MHz) frequency range, a 800 Megahertz (MHz) frequency range, a 850 MHz frequency range, a 1700 MHz frequency range, a 1900 MHz frequency range, a 2100 MHz frequency range, a 2300 MHz frequency range, a 2500 MHz frequency range, a 2600 MHz frequency range, and so forth. The transceiver itself may include components and circuitry to perform transmitting and receiving operations. The components and circuitry include analog-to-digital converters, digital-to-analog converters, modulators, amplifiers, and so forth. In embodiments, the transceiver may be coupled with one or more antennas to perform communications. Moreover, the transceiver may include and/or be coupled with the additional physical layer and Medium Access Control (MAC) layer circuitry and software to communicate in accordance with one or more cellular standards, such as the $2^{nd}$ generation (2G), 3G, 4G, and 5G or New Radio (NR) standards. Additional cellular standards and/or techniques include Enhanced Data rates for GSM Evolution (EDGE), Evolution-Data Optimized (EVDO), General Packet Radio Service (GPRS), High Speed Packet Access (HSPA), Evolved HSPA (HSPA+), Long-Term Evolution (LTE), Universal Mobile Telecommunications System (UMTS), Worldwide Interoperability for Microwave Access (WiMAX), etc. The transceiver may utilize one or more radio technologies and protocols (cellular protocols), e.g., Code-division multiple access (CDMA), frequency-division duplexing (FDD), time-division duplexing (TDD), multiple-input and multiple-output (MIMO), Orthogonal frequency-division multiple access (OFDMA), and so forth. Embodiments are not limited in this manner.

In embodiments, the client device 110 may include additional I/O devices, such as an NFC device coupled with an NFC antenna, e.g., a loop antenna. The NFC device may be a radio/controller operable to communicate in accordance with the NFC protocol and to employ electromagnetic induction via the NFC antenna. In one example, the NFC device may communicate in the unlicensed radio frequency Industrial, Scientific, and Medical (ISM) band of 13.56 MHz on International Organization for Standardization/International Electrotechnical Commission (ISO/IEC) 18000-3 air interface achieving data rates from 106 to 424 kilobits/second (kbit/s). As will be discussed in more detail below, the NFC device may be employed and provided via an application to communicate with another NFC enabled device, e.g., a transaction card 105.

In one example, the client device 110 including an NFC device may operate as an initiator and the transaction card 105 may operate as a target. In this example, the client device 110 and the transaction card 105 may operate in a passive mode of operation. The client device 110 operating as the initiator energizes and provides a carrier field for the transaction card 105 operating as the target. The transaction card 105 draws its operating power from the initiator-provided electromagnetic field. In embodiments, the client device 110 including the NFC device may continuously and periodically (or semi-periodically) search for a target, e.g., the transaction card 105. In embodiments, the client device 110 may communicate signals including data with the transaction card 105 in accordance with the NFC protocol. For example, the client device 110 may communicate with the transaction card 105 to determine a status of applets of the transaction card 105, e.g., by communicating wireless including data indicating the status of the applets. Embodiments are not limited in this manner.

In embodiments, the client device 110 may also include an EMV reader/writer capable of reading and writing to a transaction card 105 via an EMV protocol and standard. The EMV reader/writer may be used by the client device 110 to read and write from and to an integrated chip of the transaction card, for example. The EMV reader/writer may include one or more pads that may communicatively, physically, and/or electrically coupled with one or more pads of the transaction card 105. Once coupled, the client device 110 may utilize the EMV reader/writer to write data, information, applets, and so forth to the transaction card 105. In one example, the client device 110 may utilize the EMV reader/writer to update and/or add new software, such as applets, to a transaction card 105 in a secure manner, as will be discussed in more detail below. The client device 110 may also utilize the EMV reader/writer to read data, information, and so forth from the transaction card 105, e.g., an indication of the status of applets on the transaction card 105.

In some embodiments, a client device 110 of system 100 may also communicate with other components of system 100 including one or more servers 120. For example, a client device 110 may be in communication with one or more servers 120 via one or more networks 115 and may operate as a respective front-end to back-end pair with server 120. Client device 110 may transmit, for example from application or code executing on client device 110, one or more requests to server 120. The one or more requests may be associated with retrieving data from server 120 and providing data to the server 120. For example, a server 120 may receive the one or more requests from client device 110. Based on the one or more requests from client device 110, server 120 may be configured to retrieve the requested data from one or more databases (not shown). Based on receipt of the requested data from the one or more databases, server 120 may be configured to transmit the received data to client device 110, the received data being responsive to one or more requests. In one example, the data may include one or more applets for installation on a transaction card 105.

In some instances, the client device 110 may send data to the server 120. For example, the client device 110 may receive a request for a status of one or more applets on a transaction card 105. The client device 110 may determine the status of the one or more applets and provide the data to the server 120. Embodiments are not limited to this example.

In embodiments, the one or more servers 120 may include one or more processors, which are coupled to the memory. A server 120 may be configured as a central system, server or platform to control and call various data at different times to execute a plurality of workflow actions. Server 120 may be configured to connect to the one or more databases. Server 120 may also be connected to at least one client device 110. Embodiments are not limited to these components and a server 120 may include other components to perform the operations discussed herein.

System 100 may include one or more networks 115. In some examples, network 115 may be one or more of a wireless network, a wired network or any combination of wireless network and wired network, and may be configured to connect client device 110 to server 120. For example, network 115 may include one or more of a fiber optics network, a passive optical network, a cable network, an Internet network, a satellite network, a wireless local area network (LAN), a Global System for Mobile Communication, a Personal Communication Service, a Personal Area Network, Wireless Application Protocol, Multimedia Messaging Service, Enhanced Messaging Service, Short Message Service, Time Division Multiplexing based systems, Code Division Multiple Access-based systems, D-AMPS, Wi-Fi, Fixed Wireless Data, IEEE 802.11b, 802.15.1, 802.11n and 802.11g, Bluetooth, NFC, Radio Frequency Identification (RFID), Wi-Fi, and/or the like.

In addition, network 115 may include, without limitation, telephone lines, fiber optics, IEEE Ethernet 902.3, a wide area network, a wireless personal area network, a LAN, or a global network such as the Internet. In addition, network 115 may support an Internet network, a wireless communication network, a cellular network, or the like, or any combination thereof. Network 115 may further include one network, or any number of the exemplary types of networks mentioned above, operating as a stand-alone network or in cooperation with each other. Network 115 may utilize one or more protocols of one or more network elements to which they are communicatively coupled. Network 115 may translate to or from other protocols to one or more protocols of network devices. Although network 115 is depicted as a single network, it should be appreciated that according to one or more examples, network 115 may include a plurality of interconnected networks, such as, for example, the Internet, a service provider's network, a cable television network, corporate networks, such as credit card association networks, and home networks. Examples of transaction card processing are described in U.S. patent application Ser. No. 16/205,119, filed Nov. 29, 2018. The aforementioned patent application is incorporated by reference herein in its entirety.

Figure 2A:
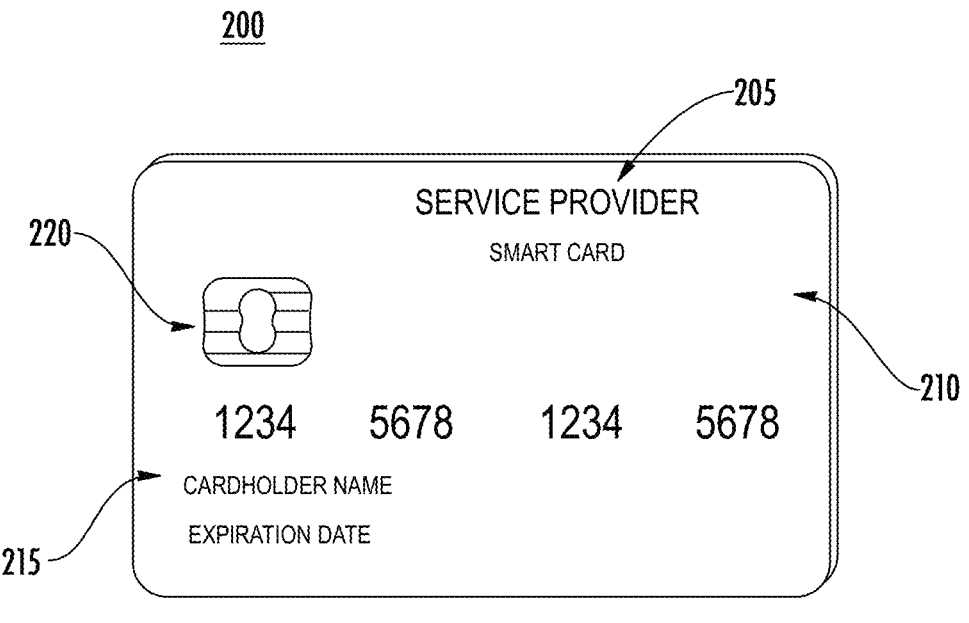
FIG. 2A is an illustration of a transaction card according to an example embodiment.

FIG. 2A illustrates an example configuration of a transaction card 200, which may include a contactless card, a payment card, such as a credit card, debit card, or gift card, issued by a service provider as displayed as service provider indicia 205 on the front or back of the card 200. In some examples, the transaction card 200 is not related to a payment card, and may include, without limitation, an identification card. In some examples, the transaction card may include a dual interface contactless payment card, a rewards card, and so forth. The transaction card 200 may include a substrate 210, which may include a single layer or one or more laminated layers composed of plastics, metals, and other materials. Exemplary substrate materials include polyvinyl chloride, polyvinyl chloride acetate, acrylonitrile butadiene styrene, polycarbonate, polyesters, anodized titanium, palladium, gold, carbon, paper, and biodegradable materials. In some examples, the transaction card 200 may have physical characteristics compliant with the ID-1 format of the ISO/IEC 7816 standard, and the transaction card may otherwise be compliant with the ISO/IEC 14443 standard. However, it is understood that the transaction card 200 according to the present disclosure may have different characteristics, and the present disclosure does not require a transaction card to be implemented in a payment card.

The transaction card 200 may also include identification information 215 displayed on the front and/or back of the card, and a contact pad 220. The contact pad 220 may include one or more pads and be configured to establish contact with another client device, such as an ATM, a user device, smartphone, laptop, desktop, or tablet computer via transaction cards. The contact pad may be designed in accordance with one or more standards, such as ISO/IEC 7816 standard, and enable communication in accordance with the EMV protocol. The transaction card 200 may also include processing circuitry, antenna and other components as will be further discussed in FIG. 2B. These components may be located behind the contact pad 220 or elsewhere on the substrate 210, e.g. within a different layer of the substrate 210. The transaction card 200 may also include a magnetic strip or tape, which may be located on the back of the card (not shown in FIG. 2A). The transaction card 210 may also include an NFC device coupled with an antenna capable of communicating via the NFC protocol. Embodiments are not limited in this manner.

Figure 2B:
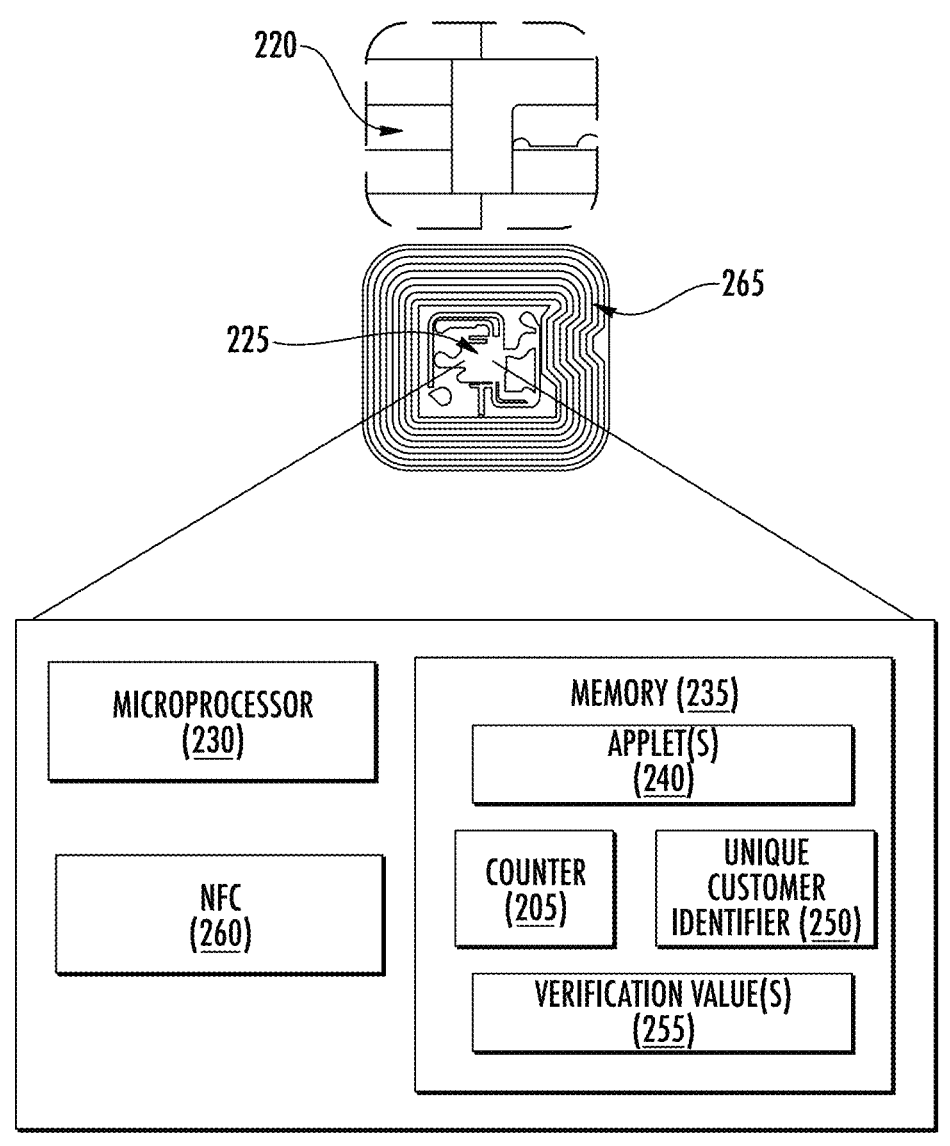
FIG. 2B is an illustration of a contact pad of the transaction card according to an example embodiment.

As illustrated in FIG. 2B, the contact pad 220 may include or be coupled with an integrated chip 225 for storing and processing information, including a microprocessor 230 including processing circuitry and memory 235. It is understood that the integrated chip 225 may contain additional components, including processors, memories, error and parity/CRC checkers, data encoders, anticollision algorithms, controllers, command decoders, security primitives, and tamper-proofing hardware, as necessary to perform the functions described herein. Although illustrated as part of or behind the contact pad 220, embodiments are not limited in this manner. In some instances, the integrated may be located in a different location of the transaction card 200 and be coupled with the contact pad 220 via one or more traces or interconnects to enable communication via EMV.

The memory 235 may be any type of memory including, but not limited to, read-only memory, write-once read-multiple memory or read/write memory, e.g., RAM, ROM, and EEPROM, and the transaction card 200 may include one or more of these memories. In some instances, the transaction card 200 may include more than one type of memory and may include encrypted and unencrypted capable memory. A read-only memory may be factory programmable as read-only or one-time programmable. One-time programmability provides the opportunity to write once then read many times. A write once/read-multiple memory may be programmed at a point in time after the memory chip has left the factory. Once the memory is programmed, it may not be rewritten, but it may be read many times. A read/write memory may be programmed and re-programmed many times after leaving the factory. It may also be read many times.

The memory 235 may be configured to store data, including one or more applets 240, one or more counters 245, a customer identifier 250, and one or more verification value (s) 255. The one or more applets 240 may include one or more software applications configured to execute on one or more transaction cards, such as Java Card applet. However, it is understood that applets 240 are not limited to Java Card applets, and instead may be any software application operable on transaction cards or other devices having limited memory. The one or more counters 245 may include a numeric counter sufficient to store an integer. The customer identifier 250 may include a unique alphanumeric identifier assigned to a user of the transaction card 200, and the identifier may distinguish the user of the transaction card from other transaction card users. In some examples, the customer identifier 250 may identify both a customer and an account assigned to that customer and may further identify the transaction card associated with the customer's account.

The one or more verification value(s) 255 may be values used to verify the applet(s) 240 stored in the memory 235 or new applets for installation in the memory 235. Each of the verification value(s) 255 may correspond to an applet 240 currently stored in the memory 235, for example, or new applets that may be stored in the memory 235 for later use. For example, the applet may be signed with a verification signature, but server 120, for example, and provided to the transaction card 200 via an ATM. The transaction card 200 including the processing circuitry 225 may determine the verification signature for an applet and whether the verification signature matches a verification value 255 stored in memory 235 to ensure that applet for installation is not corrupted and/or has been tampered with maliciously. In some instances, the verification value(s) 255 may be written to the memory 235 during original (OEM) programming as part of a one-time write process and may not be updated. This approach may provide an added level of security, however, may limit the applets 240 for installation. In some instances, new verification value(s) 255 may be added to the memory 235 from time-to-time as part of a secure write operation. In embodiments, the verification value(s) 255 may be stored in a secured manner, e.g., encrypted, and the processing circuitry 225 may include a secure instruction set that may be capable of reading the verification value(s) 255 from memory 235, decrypting the values, and enabling them for verification of applet installations and updates. The secure instruction set may utilize memory security techniques such as protection keys, memory encryption, paging, and so forth, and the processing circuitry 235 may provide a trusted execution environment.

In embodiments, the memory 235 may store one or more keys (not shown). Each key may be part of a key pair that may be used to encrypt and decrypt. In some instances, the applet 240 may include and/or be configured that it can obtain sensitive information. Thus, a server 120 may provide an applet 240 encrypted. The processing circuitry may determine the applet is encrypted and obtain a private key from memory 235. The private key may be stored in a secure location of memory 235 and be used to decrypt applets. In embodiments, the memory 235 may include more than one key used to decrypt information and applets. Once the processing circuitry obtains the key, the processing circuitry may decrypt the applet, which may then be verified and enabled for execution if verified.

In embodiments, the transaction card 200 may also include an NFC device 260 capable of communicating in accordance with an NFC protocol. The NFC device 260 may operate passively and may be energized by a signal emitted by an NFC device of the client device. The NFC device 260 may draw its power from the electromagnetic field caused by the NFC device of the client device, for example. However, embodiments are not limited in this manner. In another example, the transaction card 200 may be provided with a power source (not shown) operable to supply power to the NFC device 260 such that it can activate its own electromagnetic field. In one example and as previously discussed, the transaction card 200 may provide status updates and communicate data with an ATM or client device via the NFC device. Embodiments are not limited in this manner and the transaction card 200 may communicate other data with other devices.

In some examples, the transaction card 200 may include one or more antennas 255. The one or more antennas 255 may be placed within the transaction card 200 and around the integrated chip 225 and the contact pad 220. For example, the one or more antennas 255 may be integral with the processing circuitry 225 and the one or more antennas 255 may be used with an external booster coil. As another example, the one or more antennas 255 may be external to the contact pad 220 and the processing circuitry 225. In embodiments, the one or more antennas 255 may be coupled with the NFC device 260 and be configured to enable NFC communication.

In an embodiment, the antenna 255 including a coil of transaction card 200 may act as the secondary of an air core transformer. For example, the ATM may communicate with the transaction card 200 by cutting power or amplitude modulation. The transaction card 200 may infer the data transmitted from the ATM using the gaps in the transaction card's power connection, which may be functionally maintained through one or more capacitors. The transaction card 200 may communicate back by switching a load on the transaction card's coil or load modulation. Load modulation may be detected in the terminal's coil through interference.

Figure 3A:
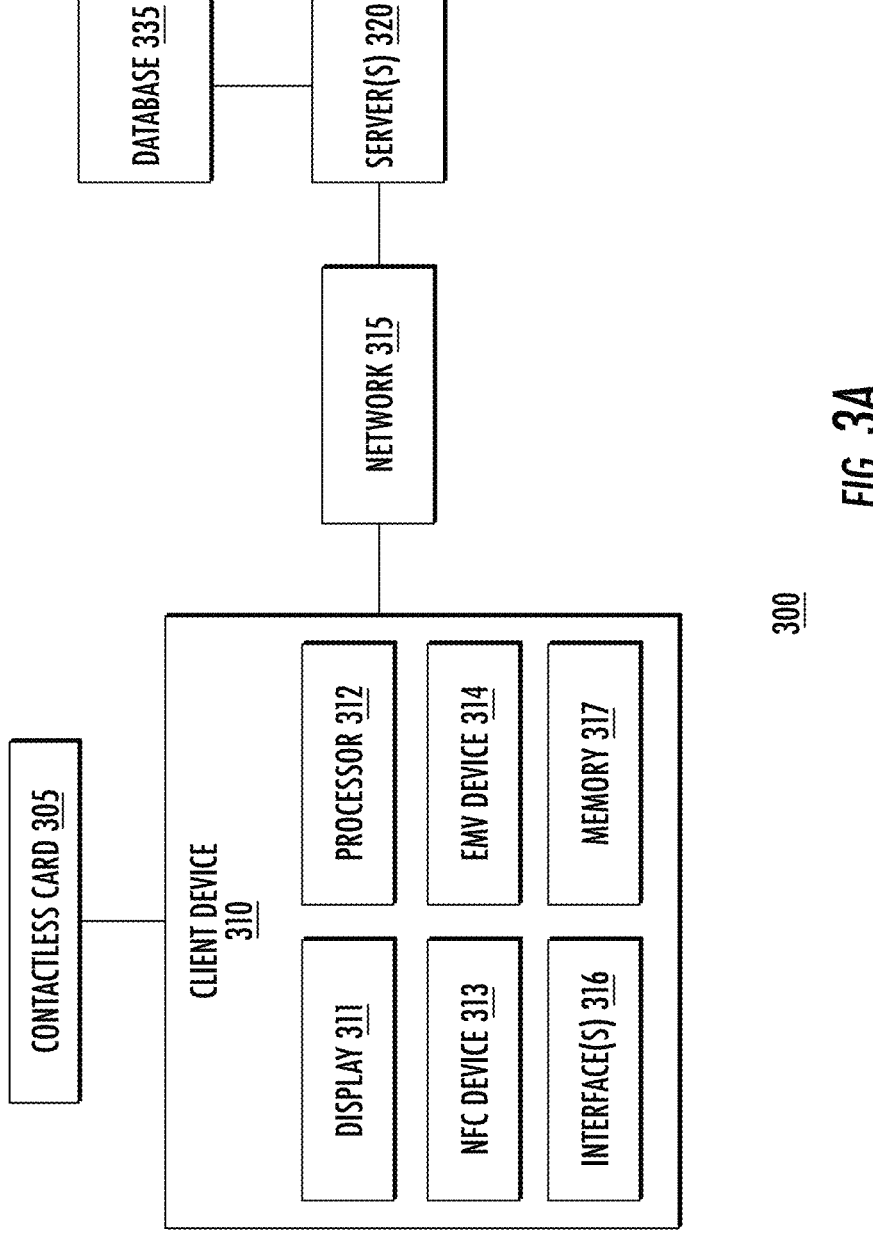
FIG. 3A is a diagram of a system using a transaction card according to an example embodiment.

FIG. 3A illustrates a system 300 including a computing device 310, such as an ATM, capable of performing operations to maintain applets on transaction card(s) 305. System 300 illustrates a client device 310 having a number of components capable of coupling and communicating with a transaction card 305 and other servers 320. The components of the client device 310 include a display 311, a processor 312, an NFC device 313, an EMV device 314, interface(s) 316, and memory 317. FIG. 3A illustrates a limited number of components for illustrative purposes only. The client device 310 may include additional components, as known to those skilled in the art, and be consistent with embodiments discussed herein.

Client device 310 may be in communication with one or more servers 320 via one or more networks 315, which may be wired and/or wireless networks. Client device 310 may transmit, a networking interface of client device 310, data to the server 320. In one example, the client device 310 may send requests associated with retrieving data and information from one or more servers 320 and database 335. For example, a server 320 may receive the one or more requests from a client device 310 and process the requests. Based on the one or more requests from client device 310, a server 320 may be configured to retrieve the requested data from one or more databases 335, for example. In embodiments, the client device 310 may send data to the server 320 via network 315. The data may include information with respect to user's account, account number, entered pin, an operation to be performed, and so forth. In some instances, the data may include a status of the transaction card 305. The data between the client device 310, the server 320 coupled with the database 335, and the transaction card 305 enable various functions and operations performed by the ATM, e.g., transactional operations, such as determine a status of an account, enable depositing of cash, enable withdrawal of cash, perform updates for an account, and transaction card operations, such as manage information and data on a transaction card 305, install applets, update applets, remove applets, and so forth.

In some embodiments, the client device 310 may communicate information and data with the servers 320 to provide applet functionality for a transaction card 305. For example, the client device 310 may communicate with the servers 320 to automatically, without user intervention, determine if one or more applets on the transaction card 305 requires an update. In another example, the client device 310 may receive a request to update an applet on the transaction card 305 by a user. In a third example, the client device 310 may communicate data with the servers to enable a user to install a new applet on the transaction card 310. Embodiments are not limited to these examples.

In embodiments, the client device 310 may include a processor 312, which may be coupled with other component including the memory 317. The processor 312 may be any type of processor and including circuitry, cache, control unit, logic, registers, clock(s), buses, and so forth. Further, the memory 317 may be any type of memory as similarly discussed above with respect to memory 235. In embodiments, the memory 235 may store one or more applications or software including instructions that may be executed by the processor 312 and the processing circuitry. The software may include instructions to perform operations discussed herein, e.g., perform transaction operations and transaction card management operations.

In embodiments, the client device 310 may communicate one or more interfaces capable of communicating with the transaction card 305. In one example, the client device 310 includes an NFC device 313 capable of communicating with the transaction card 305 using short-range wireless communication (e.g., NFC). As should be noted, those skilled in the art would understand that a distance of fewer than twenty centimeters is consistent with NFC range. When the transaction card 305 is proximate to the client device 310, the NFC device 313 may read data stored on the card, such as a status of applets. In one example, the NFC device 313 may perform one or more actions or communications with the transaction card 305, such as detecting the transaction card 305 including the card's NFC device, authenticating the card, polling the card for the status of the applets, and receiving the status. In some instances, the NFC device 313 may be enable to energize and provide power to the NFC device of the transaction card 305, as previously discussed above. In other instances, the transaction card 305 may provide its' own power for the NFC device.

In embodiments, the client device 310 may include other interfaces, such as the EMV device 314, that may be utilized to update and/or add new applets to the transaction card 305. In embodiments, the client device 310 may determine that a new applet is to be installed on the transaction card 305 or a current applet is to be updated on the transaction card 305. For example, the client device 310 may receive a user input via an input device or a touch screen display, such as display 311, to add a new applet or a selection to cause an update of a current applet to the transaction card 305. In another example, the client device 310 may determine a status of one or more applets of the transaction card 305 and determine an update is required. The client device 310 may determine the status of the one or more applets on the memory of the transaction card 305 by polling and/or sending a request to the transaction card 305 and receiving information from the transaction card 305. The request may be sent via the NFC device 313 to the transaction card 305 and a response indicating the status may be received by the NFC device 313 from the transaction card 305, as previously discussed. The status provided to the client device 310 may include information about the applets, including but not limited to, a version, an installation date, a name, an identifier, and so forth. In some instances, the status of the one or more applets may include a listing of all of the applets installed on the transaction card 305. The status may also indicate whether an applet is corrupted and/or cannot be verified by the transaction card 305, e.g., a verification value does not match a verification signature for the applet.

The client device 310 may determine that an applet is required for the transaction card 305 and send a request to the one or more servers 320 via the network 315. The request may include information about the applet, a name, a version number, metadata, and/or an identifier to identify the applet. The request may also include the status of the one or more applets on the transaction card 305 and/or an indication that an applet to be installed does not exists on the transaction card 305. The one or more servers 320 may determine the applet for installation based on the request, e.g., from the name, the version number, identifier, or combination thereof, and retrieve the applet from the database 335. The server 320 may provide the applet to the client device 310. The client device 310 may receive the applet in raw form (unencrypted) or encrypted form. In embodiments, the applet may be an executable file that may be executed by the processing circuitry of the transaction card 305. In embodiments, the applet may include, but is not limited, software to perform banking operations with the card, operate and function components of the card, update confidential information for a user of the card, and so forth. In some instances, the applet may be signed with a verification signature, e.g., a hash value, digital signature, a private key, and/or special code that may be used by the client device 310 and/or the transaction card 305 to verify the applet. If the applet is modified in any way, the verification signature and applet cannot be verified by the client device 310 and/or the transaction card 305.

In embodiments, the client device 310 may receive the applet from the server and provide the applet to the transaction card 305. In one example, the client device 310 may write the applet to the memory of the transaction card 305 using the EMV device 314. The EMV device 314 may include contact pads that couple with contact pads of the transaction card 305 and are used to write the applet to the transaction card 305 in accordance with the EMV protocol.

In some instances, the client device 310 may receive the applet encrypted from the server 320. Any encryption technique may be used to encrypt the applet and embodiments are not limited in this manner. In some instances, the client device 310 performs a decryption operation to decrypt the applet using a decryption technique prior to writing the applet to the transaction card 305. For example, the client device 310 may securely store one or more keys that may be utilized by the client device 310 to perform the decryption operation. The client device 310 may perform the decryption operation and securely store the unencrypted applet temporarily prior to be written to the transaction card 305. In other instances, the client device 310 may provide the applet to the transaction card 305 in encrypted form, and the transaction card 305 may decrypt the applet with a key stored on the transaction card 305, for example. Embodiments are not limited in this manner.

Figure 3B:
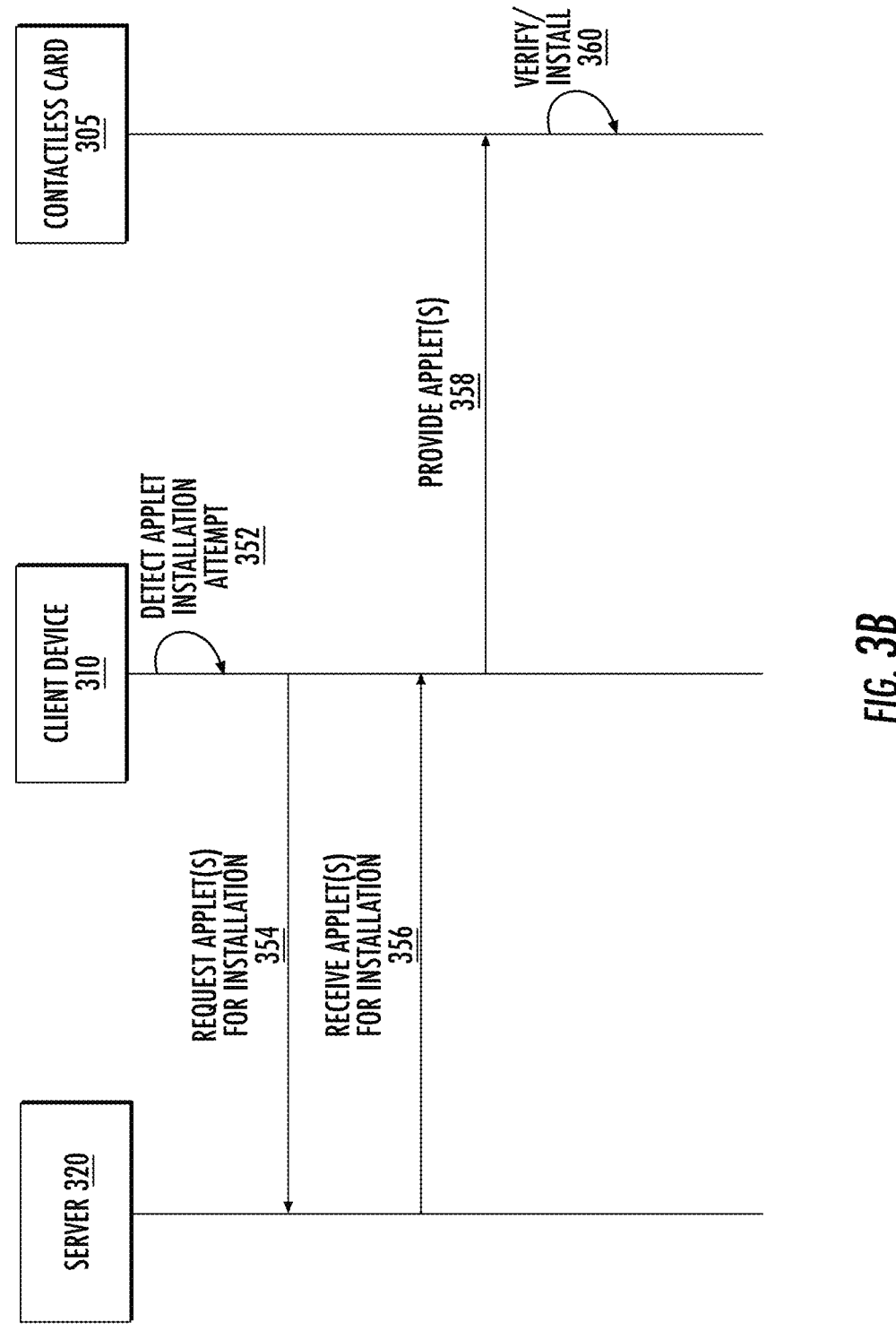
FIG. 3B is a diagram of a system using a transaction card according to an example embodiment.

FIG. 3B illustrates one possible processing sequence 350 to perform an applet installation on the transaction card 305 by the client device 310. In the illustrated embodiment, the client device 310 may be an ATM, and a user may insert a transaction card 305 in a card receiving apparatus of the ATM, e.g., a card slot including an EMV device to perform EMV read/writes, and be provided one or more operations via a graphical user interface (GUI) presented in the display of the client device 310.

In embodiments, the client device 310 may detect the transaction card 305 and determine that an applet is to be installed on the transaction card 305 at 352. In one example, the client device 310 may perform the detection based on one or more signals received via one or more interfaces, e.g., NFC information received via an NFC device, information received via the EMV card reader, information from a sensor detecting the card in the client device 310, and so forth.

The client device 310, upon detection of the transaction card 305, may present a graphical user interface (GUI) display including options to interact with the card, perform transactions and/or make updates to the card itself. In one example, the client device 310 may receive a user input to add a new applet to the card. More specifically, the client device 310 may present to a user on the display in the GUI a list of possible applets that are available for installation and receive a selection of one or more applets via an input device, a touchscreen interface, a key interface, a button, and so forth.

In some instances, the client device 310 may first determine a status of one or more applet(s) on the transaction card 305 and present the user with operations to interface the installed applet(s), e.g., update or delete, from the card. The client device 310 may first poll and/or send a request for status information about the applet(s) installed on the transaction card 305, determine which applet(s) are on the card and present one or more options for the user to interact with the card. The client device 310 may receive a user input based on the presented information and perform the request operation, install a new applet, update a current applet, remove a current applet. The client device 310 may also perform one or more operations automatically. For example, the client device 310 may detect the card at link 352 and automatically determine the status of the applet(s) on the card by requesting the information. Embodiments are not limited in this manner.

At line 354, the client device 310 may send a request to the server 320 for the one or more applet(s) indicated for installation on the transaction card 305. The request may include one or more identifiers, such as a name, identification number, and so forth. In some embodiments, the client device 310 may send status information/data with the request that may include additional information, e.g., version of the requested applet for update or installation.

At 356, the client device 310 may receive one or more applet(s) from the server 320. The one or more applet(s) may be received individually or as part of a package, e.g., zip or another grouping of files compressed for transmission. In some instances, the one or more applet(s) may be encrypted when received by the client device 310. The encrypted applet(s) may ensure that sensitive information may not be disclosed. The applet(s) may also be signed with a verification signature to ensure that they are not tampered with and/or have become corrupted during the communication from the server 320 to the client device 310. In some instances, the client device 310 may receive the applet(s) over one or more secure links, e.g., utilizing secure socket tunneling protocol (SSTP), transport layer security (TLS), secure sockets layer (SSL), secure HTTP (HTTPS), and so forth. Embodiments are not limited in this manner.

At 358, the client device 310 may provide the applet(s) to the transaction card 305. More specifically, the client device 310 including an EMV device having pads coupled with pads of the transaction card 305 may communicate and cause for storage the applet(s) in the memory of the transaction card 305. In some instances, the client device 310 may decrypt the applet(s) prior to writing them to the memory of the transaction card 305. In other instances, the client device 310 may write the applet(s) to the memory of the transaction card encrypted.

At 360, the transaction card 305 may verify and install the applet(s) for use in the memory of the transaction card 305. The transaction card 305 may verify the applet(s) by comparing the verification signature(s) used to sign the applet(s) with verification values stored in the memory of the transaction card 305. An applet may be verified if the verification signature for the applet matches a verification value stored in memory. The transaction card 305 may perform the verification for each applet or as a package of applets. Once verified, the transaction card 305 may install and/or enable execution the applet(s). In some instances, one or more applet(s) may replace one or more existing applet(s) installed on the transaction card, e.g., when a new version of an applet is available. The applet(s), once verified and installed, may be operable for execution on the transaction card 305.

In some instances, the client device 310 may not be able to verify the applet. For example, the verification signature may not match any verification value stored in the memory of the transaction card 305. In these instances, the client device 310 may discard the unverified applet from the memory transaction card 305.

FIG. 4 illustrates an example of a logic flow 400 that may be representative of some or all the operations executed by one or more embodiments described herein. For example, the logic flow 400 may illustrate operations performed by a transaction card to install a new applet or perform an update of applet on the transaction card.

At block 410, embodiments include receiving an applet signed with a verification signature. In embodiments, the applet includes one or more instructions capable for execution by processing circuitry. For example, a transaction card may receive an applet from a client device via the client device writing the applet to the memory of the transaction card. In some instances, the transaction card may store the applet in temporary memory until the applet is decrypted, verified, and installed for execution by the transaction card. In embodiments, the transaction card may receive the applet encrypted and signed with a verification signature. In other instances, the transaction card may receive the applet unencrypted and signed with the verification signature. Embodiments are not limited to receiving a single applet and in some instances, the transaction card may receive a plurality of applets from a client device.

At block 420, the logic flow 400 includes determining whether the verification signature matches one of the verification values stored on the memory. In embodiments, the transaction card may store one or more verification values in a secure memory, and the verification values may be used to verify applets by determining whether a verification signature matches a verification value.

In embodiments, the transaction card may store a plurality of verifications values, and each of the verification value may correspond with the specific applet. In embodiments, the verification values may be installed in the memory of transaction card at the time of manufacture or may be updated/installed via a secure installation procedure from time-to-time, e.g., by a bank device.

In embodiments, if the verification signature of the applet matches one of the verification values, the applet may be verified. In some embodiments, the transaction card may first decrypt the applet prior to it verifying the applet. As mentioned, the transaction card may receive the applet encrypted. The transaction card may store one or more encryption/decryption keys in a secure memory that may be utilized to decrypt the encrypted applet.

At block 430, the logic flow 400 includes enabling the applet including the instructions for execution by the processing circuitry in response to the determination the verification signature matches one of the verification values. For example, the circuitry of the transaction card may permit the applet to execute. However, at block 440, the logic flow 400 includes preventing enablement of the applet including the instructions for execution in response to the determination the verification signature does not match any of the verification values. Thus, if the transaction card cannot verify an applet, it will not let it run/execute on the transaction card. The transaction card may discard the unverifiable applet to free up memory/storage.

FIG. 5 illustrates an example of a logic flow 500 that may be representative of some or all the operations executed by one or more embodiments described herein. For example, the logic flow 500 may illustrate operations performed by a client device.

At block 510, the logic flow 500 includes detecting a transaction card comprising one or more applets. As previously mentioned, the client device may detect the transaction card upon insertion into the client device. In embodiments, the client device may determine to install an applet on the transaction card. For example, the client device may receive user input via a user interface indicating that a user wishes to install and/or update an applet on a transaction card. In another example, the client device may detect the transaction card, determine the status of one or more applets on the transaction card, and determine that one or more of the applets require an update, e.g., an applet is out of date.

At block 520, the logic flow 500 includes determining a status of one or more applets on the memory of the transaction card. The indication of status may be determined via polling using an NFC interface and NFC device, for example. Moreover, the indication of status may provide information on which applets are installed on the transaction card and which require an update.

At block 530, the logic flow 500 includes providing the indication of the status of the one or more applets to a server. Further and at block 540, the logic flow 500 includes receive the applet from the server based on the indication of the status of the one or more applets from the server. The server may determine one or more applets for installation on the contactless, retrieve the one or more applets from a data store or database, and provide the one or more applets to the client device for installation on the transaction card. In embodiments, the client device and server may communicate via one or more secure links. As mentioned, the applet(s) may also be provided to the client device encrypted and signed with a verification signature.

At block 540, the logic flow 500 includes providing, utilizing the EMV device, the applet to the transaction card. For example, the client device may write the applet to a memory of the transaction card, which may be a temporary memory until the transaction card can verify the applet. In some instances, the client device may decrypt the applet prior to writing it to memory. However, in other instances, the client device may provide the applet in an encrypted form to the transaction card. Once verified the applet might be enabled for execution on the transaction card, as previously discussed.

Figure 6:
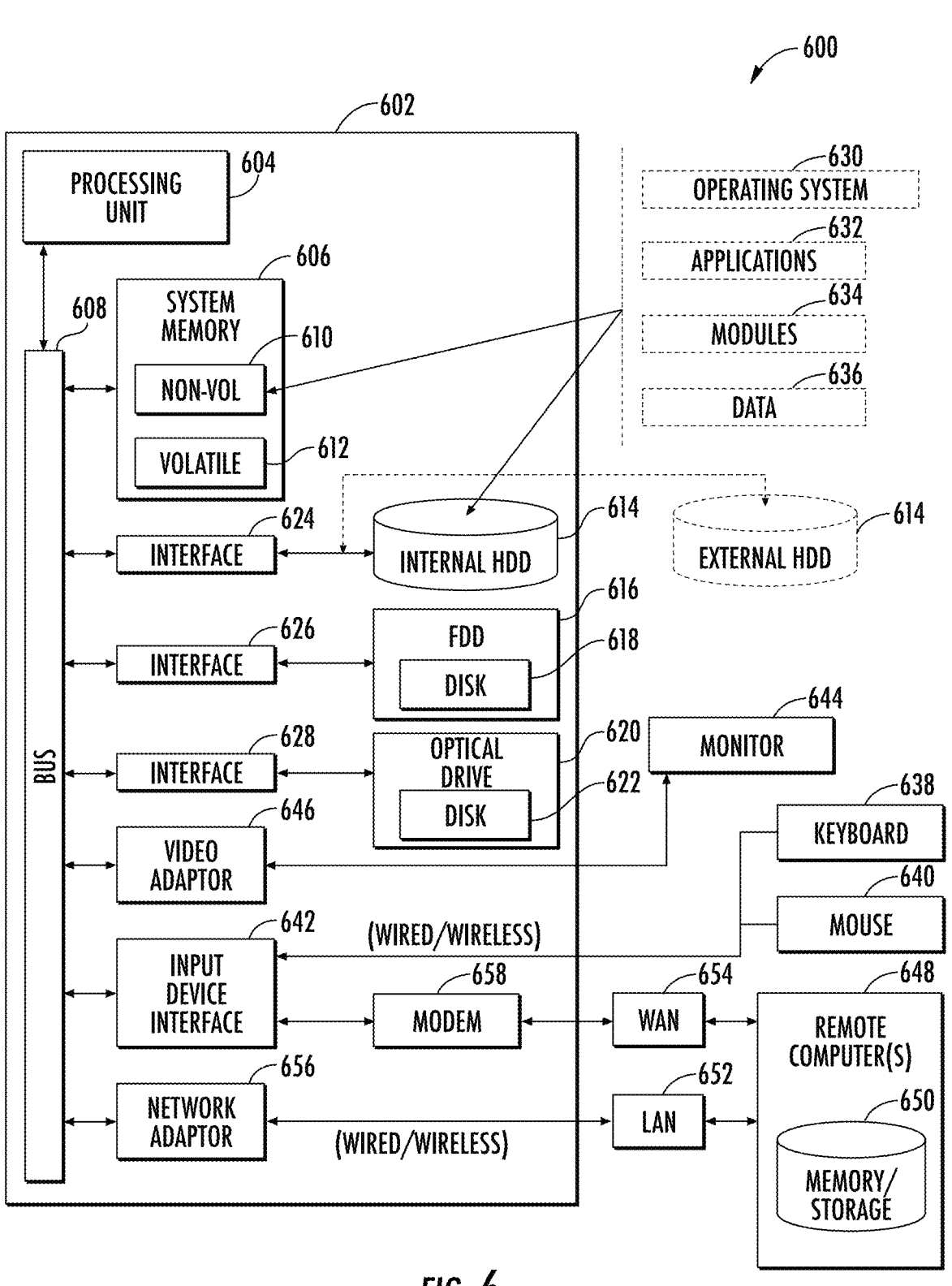
FIG. 6 illustrates an example of a computing architecture.

FIG. 6 illustrates an embodiment of an exemplary computing architecture 600 suitable for implementing various embodiments as previously described. In one embodiment, the computing architecture 600 may include or be implemented as part of system 100.

As used in this application, the terms "system" and "component" are intended to refer to a computer-related entity, either hardware, a combination of hardware and software, software, or software in execution, examples of which are provided by the exemplary computing architecture 600. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 600 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 600.

As shown in FIG. 6, the computing architecture 600 includes a processing unit 604, a system memory 606 and a system bus 608. The processing unit 604 can be any of various commercially available processors.

The system bus 608 provides an interface for system components including, but not limited to, the system memory 606 to the processing unit 604. The system bus 608 can be any of several types of bus structure that may further interconnect to a memory bus (with or without a memory controller), a peripheral bus, and a local bus using any of a variety of commercially available bus architectures. Interface adapters may connect to the system bus 608 via slot architecture. Example slot architectures may include without limitation Accelerated Graphics Port (AGP), Card Bus, (Extended) Industry Standard Architecture ((E)ISA), Micro Channel Architecture (MCA), NuBus, Peripheral Component Interconnect (Extended) (PCI(X)), PCI Express, Personal Computer Memory Card International Association (PCMCIA), and the like.

The computing architecture 600 may include or implement various articles of manufacture. An article of manufacture may include a computer-readable storage medium to store logic. Examples of a computer-readable storage medium may include any tangible media capable of storing electronic data, including volatile memory or non-volatile memory, removable or non-removable memory, erasable or non-erasable memory, writeable or re-writeable memory, and so forth. Examples of logic may include executable computer program instructions implemented using any suitable type of code, such as source code, compiled code, interpreted code, executable code, static code, dynamic code, object-oriented code, visual code, and the like. Embodiments may also be at least partly implemented as instructions contained in or on a non-transitory computer-readable medium, which may be read and executed by one or more processors to enable performance of the operations described herein.

The system memory 606 may include various types of computer-readable storage media in the form of one or more higher speed memory units, such as read-only memory (ROM), random-access memory (RAM), dynamic RAM (DRAM), Double-Data-Rate DRAM (DDRAM), synchronous DRAM (SDRAM), static RAM (SRAM), programmable ROM (PROM), erasable programmable ROM (EPROM), electrically erasable programmable ROM (EE-PROM), flash memory, polymer memory such as ferroelectric polymer memory, ovonic memory, phase change or ferroelectric memory, silicon-oxide-nitride-oxide-silicon (SONOS) memory, magnetic or optical cards, an array of devices such as Redundant Array of Independent Disks (RAID) drives, solid state memory devices (e.g., USB memory, solid state drives (SSD) and any other type of storage media suitable for storing information. In the illustrated embodiment shown in FIG. 6, the system memory 606 can include non-volatile memory 610 and/or volatile memory 612. A basic input/output system (BIOS) can be stored in the non-volatile memory 610.

The computer 602 may include various types of computer-readable storage media in the form of one or more lower speed memory units, including an internal (or external) hard disk drive (HDD) 614, a magnetic floppy disk drive (FDD) 616 to read from or write to a removable magnetic disk 618, and an optical disk drive 620 to read from or write to a removable optical disk 622 (e.g., a CD-ROM or DVD). The HDD 614, FDD 616 and optical disk drive 620 can be connected to the system bus 608 by a HDD interface 624, an FDD interface 626 and an optical drive interface 628, respectively. The HDD interface 624 for external drive implementations can include at least one or both of Universal Serial Bus (USB) and IEEE 1394 interface technologies.

The drives and associated computer-readable media provide volatile and/or nonvolatile storage of data, data structures, computer-executable instructions, and so forth. For example, a number of program modules can be stored in the drives and memory units 610, 612, including an operating system 630, one or more application programs 632, other program modules 634, and program data 636. In one embodiment, the one or more application programs 632, other program modules 634, and program data 636 can include, for example, the various applications and/or components of the system 700.

A user can enter commands and information into the computer 602 through one or more wire/wireless input devices, for example, a keyboard 638 and a pointing device, such as a mouse 640. Other input devices may include microphones, infra-red (IR) remote controls, radio-frequency (RF) remote controls, game pads, stylus pens, card readers, dongles, finger print readers, gloves, graphics tablets, joysticks, keyboards, retina readers, touch screens (e.g., capacitive, resistive, etc.), trackballs, track pads, sensors, styluses, and the like. These and other input devices are often connected to the processing unit 604 through an input device interface 642 that is coupled to the system bus 608 but can be connected by other interfaces such as a parallel port, IEEE 1394 serial port, a game port, a USB port, an IR interface, and so forth.

A monitor 644 or other type of display device is also connected to the system bus 608 via an interface, such as a video adaptor 646. The monitor 644 may be internal or external to the computer 602. In addition to the monitor 644, a computer typically includes other peripheral output devices, such as speakers, printers, and so forth.

The computer 602 may operate in a networked environment using logical connections via wire and/or wireless communications to one or more remote computers, such as a remote computer 648. The remote computer 648 can be a workstation, a server computer, a router, a personal computer, portable computer, microprocessor-based entertainment appliance, a peer device or other common network node, and typically includes many or all the elements described relative to the computer 602, although, for purposes of brevity, only a memory/storage device 650 is illustrated. The logical connections depicted include wire/wireless connectivity to a local area network (LAN) 652 and/or larger networks, for example, a wide area network (WAN) 654. Such LAN and WAN networking environments are commonplace in offices and companies, and facilitate enterprise-wide computer networks, such as intranets, all of which may connect to a global communications network, for example, the Internet.

When used in a LAN networking environment, the computer 602 is connected to the LAN 652 through a wire and/or wireless communication network interface or adaptor 656. The adaptor 656 can facilitate wire and/or wireless communications to the LAN 652, which may also include a wireless access point disposed thereon for communicating with the wireless functionality of the adaptor 656.

When used in a WAN networking environment, the computer 602 can include a modem 658, or is connected to a communications server on the WAN 654 or has other means for establishing communications over the WAN 654, such as by way of the Internet. The modem 658, which can be internal or external and a wire and/or wireless device, connects to the system bus 608 via the input device interface 642. In a networked environment, program modules depicted relative to the computer 602, or portions thereof, can be stored in the remote memory/storage device 650. It will be appreciated that the network connections shown are exemplary and other means of establishing a communications link between the computers can be used.

The computer 602 is operable to communicate with wire and wireless devices or entities using the IEEE 602 family of standards, such as wireless devices operatively disposed in wireless communication (e.g., IEEE 602.11 over-the-air modulation techniques). This includes at least Wi-Fi (or Wireless Fidelity), WiMax, and Bluetooth™ wireless technologies, among others. Thus, the communication can be a predefined structure as with a conventional network or simply an ad hoc communication between at least two devices. Wi-Fi networks use radio technologies called IEEE 602.118 (a, b, g, n, etc.) to provide secure, reliable, fast wireless connectivity. A Wi-Fi network can be used to connect computers to each other, to the Internet, and to wire networks (which use IEEE 602.3-related media and functions).

The various elements of the devices as previously described with reference to FIGS. 1-5C may include various hardware elements, software elements, or a combination of both. Examples of hardware elements may include devices, logic devices, components, processors, microprocessors, circuits, processors, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include software components, programs, applications, computer programs, application programs, system programs, software development programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. However, determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Figure 7:
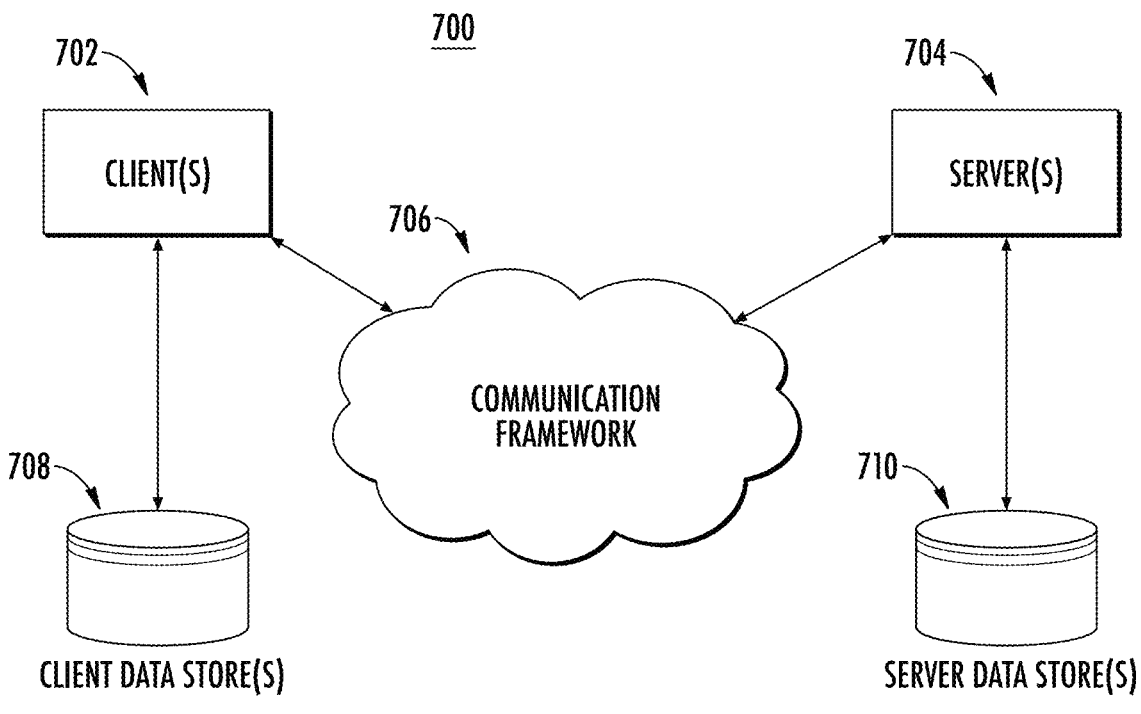
FIG. 7 illustrates an example of a communications architecture.

FIG. 7 is a block diagram depicting an exemplary communications architecture 700 suitable for implementing various embodiments as previously described. The communications architecture 700 includes various common communications elements, such as a transmitter, receiver, transceiver, radio, network interface, baseband processor, antenna, amplifiers, filters, power supplies, and so forth. The embodiments, however, are not limited to implementation by the communications architecture 700, which may be consistent with system 100.

As shown in FIG. 7, the communications architecture 700 includes one or more clients 702 and servers 704. The servers 704 may implement one or more devices of FIGS. 1A and 1B. The clients 702 and the servers 704 are operatively connected to one or more respective client data stores 706 and server data stores 710 that can be employed to store information local to the respective clients 702 and servers 704, such as cookies and/or associated contextual information.

The clients 702 and the servers 704 may communicate information between each other using a communication framework 710. The communications framework 710 may implement any well-known communications techniques and protocols. The communications framework 710 may be implemented as a packet-switched network (e.g., public networks such as the Internet, private networks such as an enterprise intranet, and so forth), a circuit-switched network (e.g., the public switched telephone network), or a combination of a packet-switched network and a circuit-switched network (with suitable gateways and translators).

The communications framework 710 may implement various network interfaces arranged to accept, communicate, and connect to a communications network. A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 702.7a-x network interfaces, IEEE 702.16 network interfaces, IEEE 702.20 network interfaces, and the like. Further, multiple network interfaces may be used to engage with various communications network types. For example, multiple network interfaces may be employed to allow for the communication over broadcast, multicast, and unicast networks. Should processing requirements dictate a greater amount speed and capacity, distributed network controller architectures may similarly be employed to pool, load balance, and otherwise increase the communicative bandwidth required by clients 702 and the servers 704. A communications network may be any one and the combination of wired and/or wireless networks including without limitation a direct interconnection, a secured custom connection, a private network (e.g., an enterprise intranet), a public network (e.g., the Internet), a Personal Area Network (PAN), a Local Area Network (LAN), a Metropolitan Area Network (MAN), an Operating Missions as Nodes on the Internet (OMNI), a Wide Area Network (WAN), a wireless network, a cellular network, and other communications networks.

The components and features of the devices described above may be implemented using any combination of discrete circuitry, application specific integrated circuits (ASICs), logic gates and/or single chip architectures. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

What is claimed is:

1. A computer-implemented method, comprising:

storing, by a processor of a computer system, a plurality of verification values to a memory of a contactless card;

installing, by the processor of the computer system, a first applet to the memory of the contactless card, wherein the first applet is configured to perform payments with payment information, and wherein the first applet is stored with a unique customer identifier in the memory;

installing, by the processor, a second applet to the memory of the contactless card, wherein the second applet is configured to perform authentication operations to authenticate a customer and, wherein the second applet is stored with the unique customer identifier in the memory;

enabling, by the processor, the first applet based on verification of the first applet, the verification of the first applet comprising:

identifying a verification signature associated with the first applet;

selecting a verification value of the plurality of verification values;

comparing the selected verification value with the verification signature associated with the first applet; and verifying the first applet if the verification signature associated with the first applet matches the selected verification value; and enabling, by the processor, the second applet based on verification of the second applet, the verification of the second applet comprising:

identifying a verification signature associated with the second applet;

selecting a verification value of the plurality of verification values;

comparing the selected verification value with the verification signature associated with the second applet; and verifying the second applet if the verification signature associated with the second applet matches the selected verification value.

2. The computer-implemented method of claim 1, comprising verifying the customer is associated with the contactless card, wherein verifying the customer is associated with the contactless card, comprises verifying an identification number associated with the customer.

3. The computer-implemented method of claim 1, comprising verifying the customer is associated with the contactless card, wherein verifying the customer is associated with the contactless card, comprises sending a request to a server of a financial institution system, the request comprising an identification number of the customer.

4. The computer-implemented method of claim 1, comprising:

sending, by the processor of the computer system, a request to a server of a financial institutional system to verify the customer is associated with a contactless card.

5. The computer-implemented method of claim 1, wherein the second applet is configured to send encrypted data to another device to perform the authentication operations.

6. The computer-implemented method of claim 1, wherein installing the first applet and the second applet comprises writing the first applet and the second applet to secure locations of the memory via a physical connection with contact pads of the contactless card.

7. The computer-implemented method of claim 1, wherein installing the first applet and the second applet comprises writing the first applet and the second applet to secure locations of the memory via a wireless connection with an antenna of the contactless card.

8. The computer-implemented method of claim 1, comprising:

receiving the first applet and the second applet from a server hosted by a financial institutional system.

9. The computer-implemented method of claim 8, wherein the first applet and the second applet are encrypted, and the method comprises decrypting the first applet and the second applet prior to installing the first applet and the second applet on the contactless card.

10. The computer-implemented method of claim 8, wherein the first applet and the second applet are received encrypted, and the method comprises installing the first applet and the second applet encrypted on to the contactless card.

11. A non-transitory computer-readable storage medium, the computer-readable storage medium including instructions that when executed by a computer, cause the computer to:

store a plurality of verification values to a memory of a contactless card;

install a first applet to the memory of the contactless card, wherein the first applet is configured to perform payments with payment information, and wherein the first applet is stored with a unique customer identifier in the memory;

install a second applet to the memory of the contactless card, wherein the second applet is configured to perform authentication operations to authenticate a customer and, wherein the second applet is stored with the unique customer identifier in the memory;

enable the first applet based on verification of the first applet, the verification of the first applet comprising:

identifying a verification signature associated with the first applet;

selecting a verification value of the plurality of verification values;

comparing the selected verification value with the verification signature associated with the first applet; and verifying the first applet if the verification signature associated with the first applet matches the selected verification value; and enable the second applet based on verification of the second applet, the verification of the second applet comprising:

identifying a verification signature associated with the second applet;

selecting a verification value of the plurality of verification values;

comparing the selected verification value with the verification signature associated with the second applet; and verifying the second applet if the verification signature associated with the second applet matches the selected verification value.

12. The computer-readable storage medium of claim 11, wherein the computer-readable storage medium including the instructions that when executed by the computer, cause the computer to:

automatically detect the contactless card;

automatically determine, based on the detection, a status of the first applet, the second applet, or both; and automatically determine, based on the status, to install the first applet, the second applet, or both onto the contactless card.

13. The computer-readable storage medium of claim 11, wherein the computer-readable storage medium including the instructions that when executed by the computer, cause the computer to receive the first applet and the second applet from a database of a financial institutional system.

14. The computer-readable storage medium of claim 11, wherein the computer-readable storage medium including the instructions that when executed by the computer, cause the computer to verify the customer is associated with the contactless card, wherein verify the customer is associated with the contactless card, comprises verifying an identification number associated with the customer.

15. The computer-readable storage medium of claim 11, wherein the computer-readable storage medium including the instructions that when executed by the computer, cause the computer to verify the customer is associated with the contactless card, wherein verifying the customer is associated with the contactless card, comprises sending a request to a server associated with a financial institution system, the request comprising an identification number of the customer.

16. The computer-readable storage medium of claim 11, wherein the computer-readable storage medium, including the instructions that, when executed by the computer, cause the computer to send a request to a server of a financial institutional system to verify the customer is associated with the contactless card.

17. The computer-readable storage medium of claim 11, wherein the second applet is configured to provide encoded data generated using cryptography for multifactor authentication (MFA) for the authentication operations.

18. The computer-readable storage medium of claim 17, wherein the second applet is configured to respond to one or more requests and provide the encoded data over near-field communication (NFC).

19. The computer-readable storage medium of claim 11, wherein the second applet is configured to send encrypted data to another device to perform the authentication operations.

20. The computer-readable storage medium of claim 11, wherein installing the first applet and the second applet comprises writing the first applet and the second applet to secure locations of the memory via a physical connection with contact pads of the contactless card.

21. The computer-readable storage medium of claim 11, wherein installing the first applet and the second applet comprises writing the first applet and the second applet to secure locations of the memory via a wireless connection with an antenna of the contactless card.

22. A computing apparatus comprising:

a processor; and a computing memory storing instructions that, when executed by the processor, configure the processor to:

store a plurality of verification values to a memory of a contactless card;

install a first applet to the memory of the contactless card, wherein the first applet is configured to perform payments with payment information, and wherein the first applet is stored with a unique customer identifier in the memory;

install a second applet to the memory of the contactless card, wherein the second applet is configured to perform authentication operations to authenticate the customer and, wherein the second applet is stored with the unique customer identifier in the memory;

activate the first applet based on verification of the first applet, the verification of the first applet comprising:

identifying a verification signature associated with the first applet;

selecting a verification value of the plurality of verification values;

comparing the selected verification value with the verification signature associated with the first applet; and verifying the first applet if the verification signature associated with the first applet matches the selected verification value; and activate the second applet based on verification of the second applet, the verification of the second applet comprising:

identifying a verification signature associated with the second applet;

selecting a verification value of the plurality of verification values;

comparing the selected verification value with the verification signature associated with the second applet; and verifying the second applet if the verification signature associated with the second applet matches the selected verification value.

23. The computing apparatus of claim 22, wherein the processor to verify the customer is associated with the contactless card to verify an identification number associated with the customer.

24. The computing apparatus of claim 22, wherein the processor to:

verify the customer is associated with the contactless card to send a request to a server associated with a financial institution system, the request comprising an identification number of the customer.

25. The computing apparatus of claim 22, comprising the instructions to configure the apparatus to:

send a request to a server of a financial institutional system to verify the customer is associated with the contactless card.

26. The computing apparatus of claim 22, wherein the second applet is configured to provide encoded data generated using cryptography for multifactor authentication (MFA) for the authentication operations.

27. The computing apparatus of claim 26, wherein the second applet is configured to respond to one or more requests and provide the encoded data via near-field communication (NFC).

28. The computing apparatus of claim 22, wherein installing the first applet and the second applet comprises write the first applet and the second applet to secure locations of the memory via a physical connection with contact pads of the contactless card.

29. The computing apparatus of claim 22, wherein installing the first applet and the second applet comprises write the first applet and the second applet to secure locations of the memory via a wireless connection with an antenna of the contactless card.

30. The computing apparatus of claim 22, wherein the first applet and the second applet are encrypted, and the instructions to cause the apparatus to decrypt the first applet and the second applet prior to installing the first applet and the second applet on the contactless card.

\* \* \* \* \*